(12) United States Patent
The Losen et al.

(10) Patent No.: US 11,702,301 B2
(45) Date of Patent: Jul. 18, 2023

(54) MATERIAL HANDLING SYSTEMS AND METHODS FOR SELECTING AND REMOVING ITEMS FROM A BUNDLE

(71) Applicants: Jacob The Losen, Gainesville, FL (US); Wells The Losen, Gainesville, FL (US)

(72) Inventors: Jacob The Losen, Gainesville, FL (US); Wells The Losen, Gainesville, FL (US)

( * ) Notice: Subject to any disclaimer, the term of this patent is extended or adjusted under 35 U.S.C. 154(b) by 0 days.

(21) Appl. No.: 17/680,215

(22) Filed: Feb. 24, 2022

(65) Prior Publication Data

US 2022/0267105 A1  Aug. 25, 2022

Related U.S. Application Data

(60) Provisional application No. 63/152,938, filed on Feb. 24, 2021.

(51) Int. Cl.
*B65G 59/02* (2006.01)
(52) U.S. Cl.
CPC .................... *B65G 59/02* (2013.01)
(58) Field of Classification Search
CPC ........................ B65G 59/02; B65G 2201/0217

USPC ...... 414/796.8, 796.5, 796.7, 746.4; 221/273
See application file for complete search history.

(56) References Cited

U.S. PATENT DOCUMENTS

| | | | | |
|---|---|---|---|---|
| 1,683,779 A * | 9/1928 | Horstkotte | ........... | B65G 59/005 221/209 |
| 2,628,726 A * | 2/1953 | Van Schie | ................. | B66C 1/28 414/626 |
| 3,231,102 A * | 1/1966 | Boyle | .................... | B65G 59/02 221/209 |
| 4,405,276 A * | 9/1983 | Wiegand | .............. | B65G 59/026 271/42 |
| 4,417,836 A * | 11/1983 | Schiepe | ................. | B65G 59/02 414/796.6 |
| 2017/0341879 A1 * | 11/2017 | Plett | ..................... | B65G 47/904 |

* cited by examiner

*Primary Examiner* — Lynn E Schwenning
(74) *Attorney, Agent, or Firm* — Talem IP Law, LLP (57) ABSTRACT

A material handling apparatus for selecting and removing items from a bundle such as stacked pieces of lumber boards is provided. Systems containing such apparatuses and methods for selecting and removing items from a bundle also are provided. The items are arranged in vertical columns and horizontal rows in the bundle; and ejector assemblies are used to individually remove the items. Other suitable items include, for example, wood, rolls, tubes, pipes, rods, packages, containers, bags, cases, cartons, and boxes.

11 Claims, 11 Drawing Sheets

MATERIAL HANDLING SYSTEMS AND METHODS FOR SELECTING AND REMOVING ITEMS FROM A BUNDLE

CROSS-REFERENCE TO RELATED APPLICATIONS

This application claims the benefit of U.S. Provisional Patent Application No. 63/152,938 filed Feb. 24, 2021, the entire disclosure of which is incorporated by reference.

BACKGROUND OF THE INVENTION

Field of the Invention

The present invention relates generally to material handling apparatuses for selecting and removing items from a bundle such as stacked pieces of lumber boards. The invention also encompasses systems containing such apparatuses and methods for selecting and removing items from a bundle. More particularly, the invention relates to apparatuses, wherein individual items are selected and removed from a stacked bundle of items. The non-selected other items remain in the bundle. The items are arranged in vertical columns and horizontal rows in the bundle; and ejector assemblies are used to individually select remove the items.

Brief Review of the Related Art

For ease of reference, the present invention will be primarily described herein with respect to the handling of lumber boards, for example, wood, that has been processed into pieces of defined dimensions such as, for example, 2×4, 2×6, and 4×4 pieces and the like. However, it should be understood the invention is suitable for handling any stackable items.

Normally, boards are stacked into large, banded bundles in columns and rows. These bundles or stacks are typically positioned on top of a pallet for transport and storage with each bundle having lumber boards of identical dimensions. In many circumstances, it is desirable to remove one or more boards from a disbanded bundle or stack. These boards can be used to fill a large order from a builder or provide a few boards to a do-it-yourself project person. While removing boards from the stack, often referred to as picking, can be accomplished by hand, it can be beneficial in some circumstances to have a mechanical system or apparatus to accomplish this process. Such systems reduce the chance for injury and provide a means for accomplishing the task more quickly.

To that end, apparatuses have been developed, wherein individual boards are removed from a stack and delivered onto a conveyor, ramp, chute, or, the like for further handling. In many known apparatuses, For example, Newnes, U.S. Pat. No. 3,643,621 discloses an apparatus having stick-placing units for lumber, each unit consisting of a vertically disposed elongated magazine-type container for containing sticks, a holding mechanism for holding the sticks in the magazine, and movable means for transporting the lowermost stick from the magazine and placing it upon a layer of lumber. The units are positioned in places where sticks are required and all the units are operated simultaneously by an operating mechanism.

Kvalheim, U.S. Pat. No. 6,162,009 discloses a method and apparatus for dispensing and feeding to a workstation elongated articles such as lumber boards or other elongated articles having planar top and bottom surfaces. Articles of each shape are dispensed onto the pathway from a group of articles all having that shape in common and the articles dispensed from all the groups are fed sequentially along the common pathway in a downstream direction to the workstation.

Goater, U.S. Pat. No. 7,713,018 discloses a bottom board separator that can remove the bottom board from a stack of lumber moving at process speed. The bottom board separator carries stacks of lumber on a first set of stack conveyors that are spaced apart along a path. Abutment surfaces push the bottom board transversely out from under the stack. A second set of stack conveyors follow the abutment surface and support the remaining part of the stack. Movable guides keep the remaining part of the stack traveling in the process direction.

Aylsworth, U.S. Pat. No. 11,014,768 discloses a lumber transfer system that includes an overhead track and a lower conveyor for retrieving and delivering boards from multiple racks of lumber to a platform leading to a saw. A board picker travels along the track to pick up a chosen board from one of the racks. The board picker then releases the board onto the conveyor. The conveyor conveys the board underneath the other racks and delivers the board to the saw feed platform.

In many known apparatuses, the mechanisms that are used are overly complicated or subject to breakdown or inaccuracy or provide less than optimal control over the released boards and remaining boards in the stack. There is a need for an improved material handling apparatus and system, particularly for selecting and removing lumber boards from stacked bundles. The present invention provides improved material handling apparatuses for selecting and removing items from a bundle such as stacked pieces of lumber boards. The invention also encompasses systems containing such apparatuses and methods for selecting and removing items from a bundle.

SUMMARY OF THE INVENTION

In brief summary, the invention in various embodiments is a material handling apparatus, or a system including one or more such apparatuses, where the apparatus is capable of removing single items such as lumber boards from a disbanded stack or bundle of items while maintaining the integrity of the columns and rows of the remaining items. The apparatus maintains and controls a stack of boards, the boards being organized in adjacent vertical columns and horizontal rows. Individual boards are ejected from the top of an outermost, forward, front vertical column of boards onto a conveyor, ramp, chute, or the like for further handling. All of the boards are released first from the outermost column prior to releasing the boards from the next adjacent vertical column of boards.

The stack is advanced such that the outermost or front vertical column of boards is positioned between two ejector sub-assemblies. When actuated, each ejector sub-assembly removes the uppermost individual board in the outermost vertical column of boards. Upon ejecting an uppermost board, the two ejector sub-asemblies are lowered into alignment with the board immediately below the previously ejected board, this board now becoming the uppermost board in the outermost vertical column. Upon ejection of this board by the ejector sub-assemblies, the steps are repeated down the outermost vertical column until all of the boards have been removed from the outermost vertical column.

After ejection of the last board, originally the lowermost board in the vertical column, the stack is advanced such that the now-exposed outermost vertical column, originally the second column in the stack, is positioned between the ejector sub-assemblies, the ejector sub-assemblies being raised into alignment with the uppermost board of this new outermost vertical column. The sequential removal of uppermost boards from this vertical column is repeated as before, and the stack is successively advanced until each of the vertical columns has been positioned between the ejector sub-assemblies and all boards have been removed.

Each ejector sub-assembly comprises a rotatable cam member positioned such that the cam member can be rotated between a recessed orientation and a contacting orientation relative to the end of the uppermost board member. In the recessed orientation, wherein a portion of the cam member having a shorter radius faces the end of the board, the cam does not abut the end of the board. In the contacting orientation, a portion of the cam member having a longer radius is brought into abutment with the end of the board, such that continued rotation of the cam results in ejection of the board from the vertical column, the rotation of the two cam members being in opposing directions to propel the board away from the stack.

Each ejector sub-assembly may further comprise a retention member, such as a short arm or plate member, that extends across the forward face of the board positioned directly beneath the uppermost board to be ejected. The retention member prevents the lower board from forward movement when the uppermost board is ejected such that the integrity of the outermost vertical column is maintained.

Each ejector sub-assembly may further comprise an elevator mechanism, such as a threaded rod or equivalent structure, which functions to raise and lower the ejector assembly for proper alignment with the board to be ejected from the vertical column.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

The present invention provides improved material handling apparatuses for selecting and removing items from a bundle such as stacked pieces of lumber boards. The invention also encompasses systems containing such apparatuses and methods for selecting and removing items from a bundle.

It should be understood that although the apparatuses, systems, and methods of this invention are described primarily herein as being suitable for selecting and removing lumber boards from a bundle of boards, the invention can be used for selecting and removing any suitable item. For example, items made of metal, plastic, composite, wood, and the like are suitable. Examples of such items included, but are not limited to, lumber, rolls, tubes, pipes, rods, packages, containers, bags, cases, cartons, boxes, and the like. Other items include, for example, carpeting, rugs, panels, plywood, sheetrock, and appliances. Preferably, the bundle contains lumber boards or elongated items having a substantially rectangular shape similar to boards.

Figure 1:
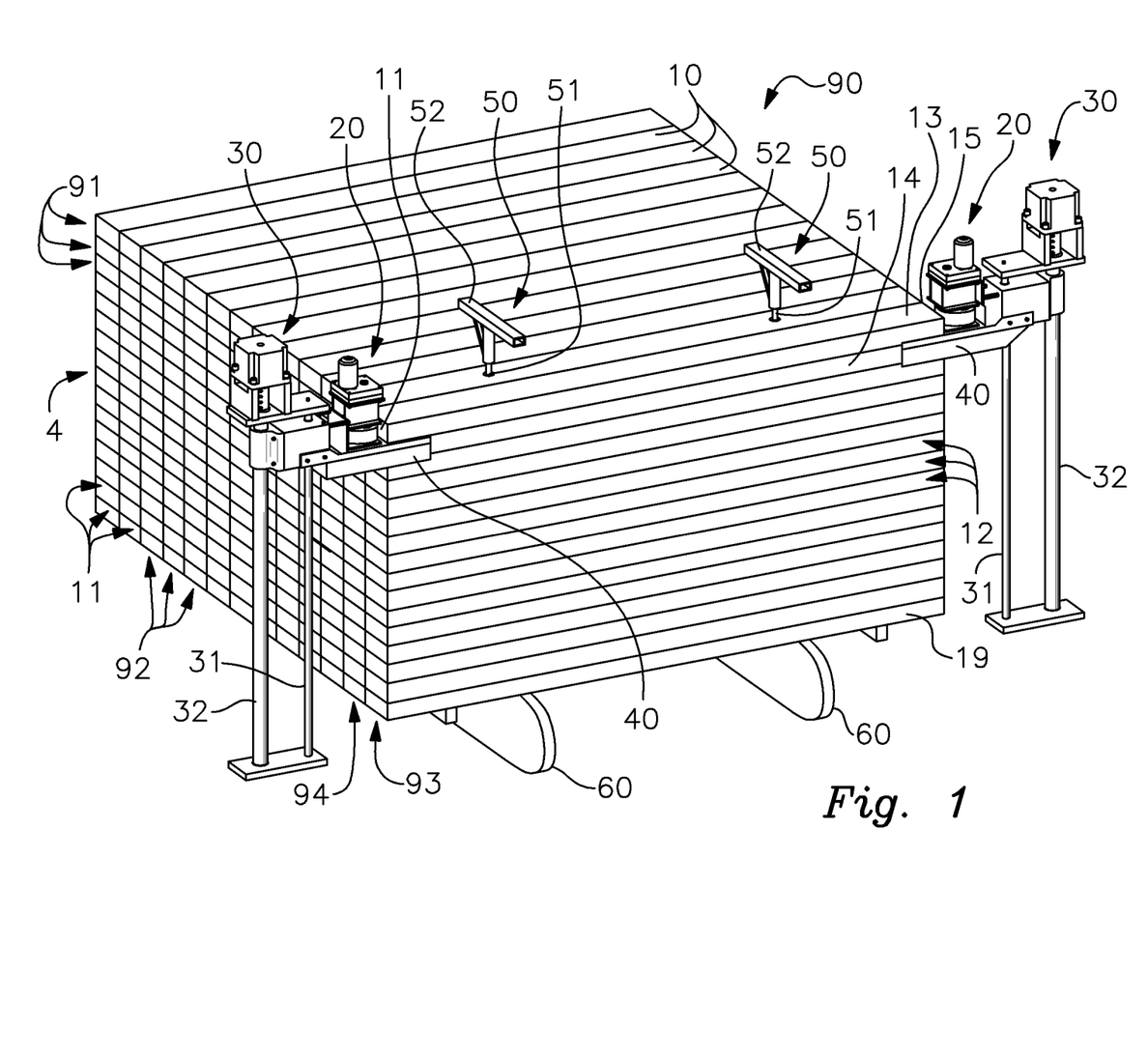
FIG. 1 is a perspective view of one embodiment of a material handling apparatus of the present invention.
Figure 2:
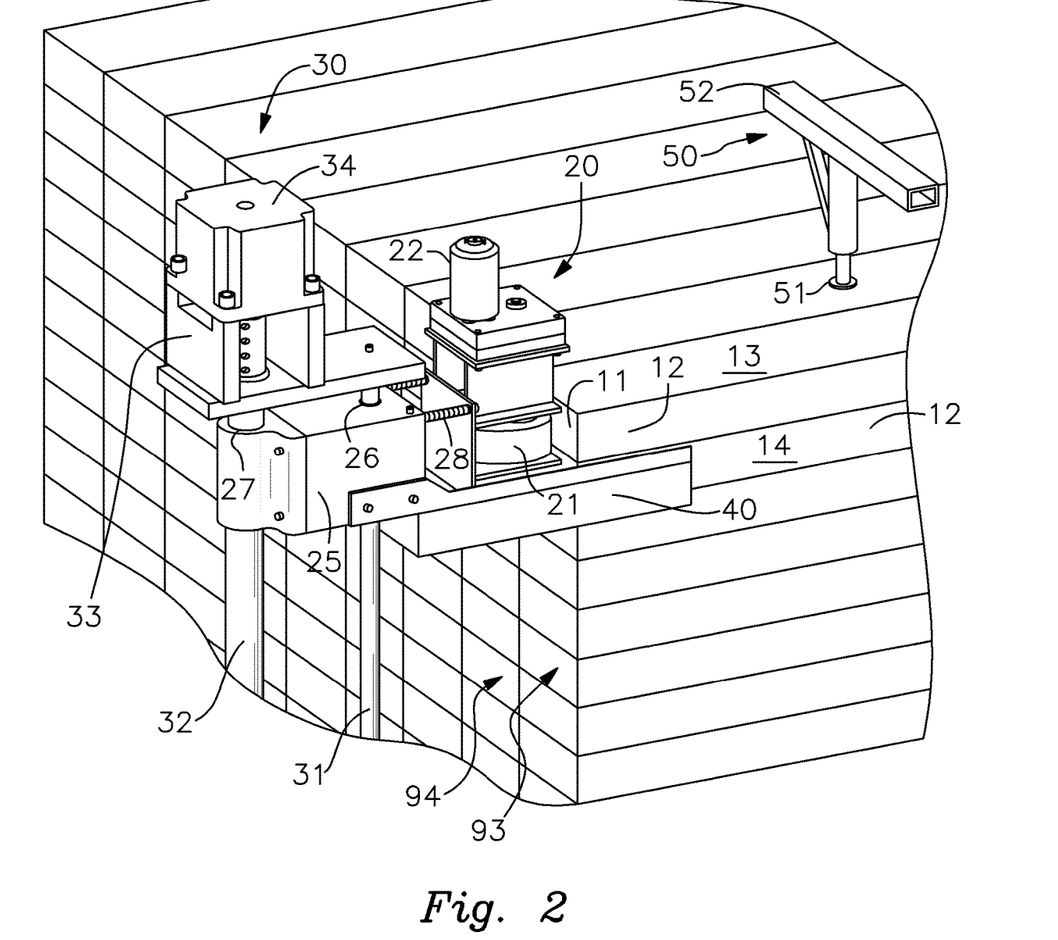
FIG. 2 is a partial perspective illustrating the ejector assembly and uppermost portion of the elevator mechanism of the embodiment of the apparatus shown in FIG. 1.

Referring to the Figures, where like reference numerals are used to designate like elements, FIGS. 1-8 show one embodiment of the material handling assembly or apparatus (4) of the present invention. In FIG. 1, the material handling assembly (4) is capable of removing by ejection single boards (10) from a disbanded stack or bundle (90) of boards, while maintaining the integrity of the vertical columns (92) and horizontal rows (91) of the remaining boards (10). The individual boards (10) are typically ejected onto a ramp, chute, belt conveyor, or the like for further transport or handling of the boards.

The apparatus (4) maintains and controls a disbanded stack (90) of boards, the boards (10) being organized in vertical columns (92) and horizontal rows (91) and typically stacked onto a pallet for ease of transport. The stack or bundle (90) presents on its forward side an outermost vertical column (93) and a second or adjacent vertical column (94) with the uppermost board (13) in the outermost vertical column (93) being the board (10) that is ejected by a pair of ejector assemblies (20), as shown best in FIG. 1.

Individual boards (10) are released from the top of the outermost, that is, the front or vertical column (93) of boards (10), with all of the boards (10) being released from the exposed outermost column (93) prior to releasing boards from the next adjacent vertical column (94). To initiate the operation, the stack (90) is positioned in or on a reciprocating frame and advanced by a stack advancement mechanism (60), such as, for example, a chain/belt, a screw drive, or the like and such that the outermost vertical column (93) of boards (10) is positioned between two opposing ejector sub-assemblies (20).

Thus, as shown in FIG. 1, the material handling assembly (4) comprises; i) a bundle of multiple elongated items (90), the items being arranged horizontally in a stack so that one item (13) overlays a second item (14), the stacked items forming a horizontal row (91) and vertical column (92), wherein the vertical column contains an uppermost (13) and a lowermost item (19). Preferably, the items (90) are boards of lumber, and the bundle (90) comprises multiple horizontal rows (91) and vertical columns (92).

Figure 3:
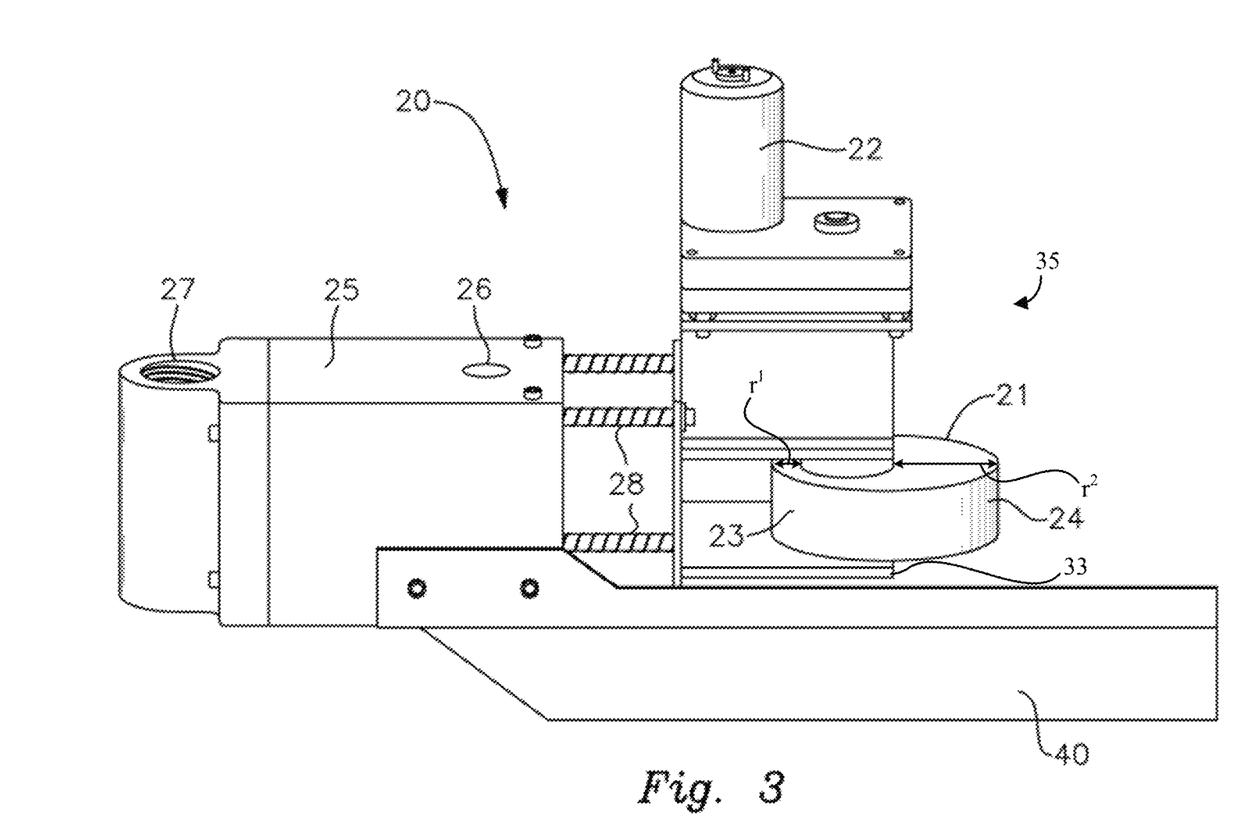
FIG. 3 is a front view of the ejector assembly of the embodiment of the apparatus shown in FIG. 1, wherein the cam member is positioned in the contacting orientation.
Figure 4:
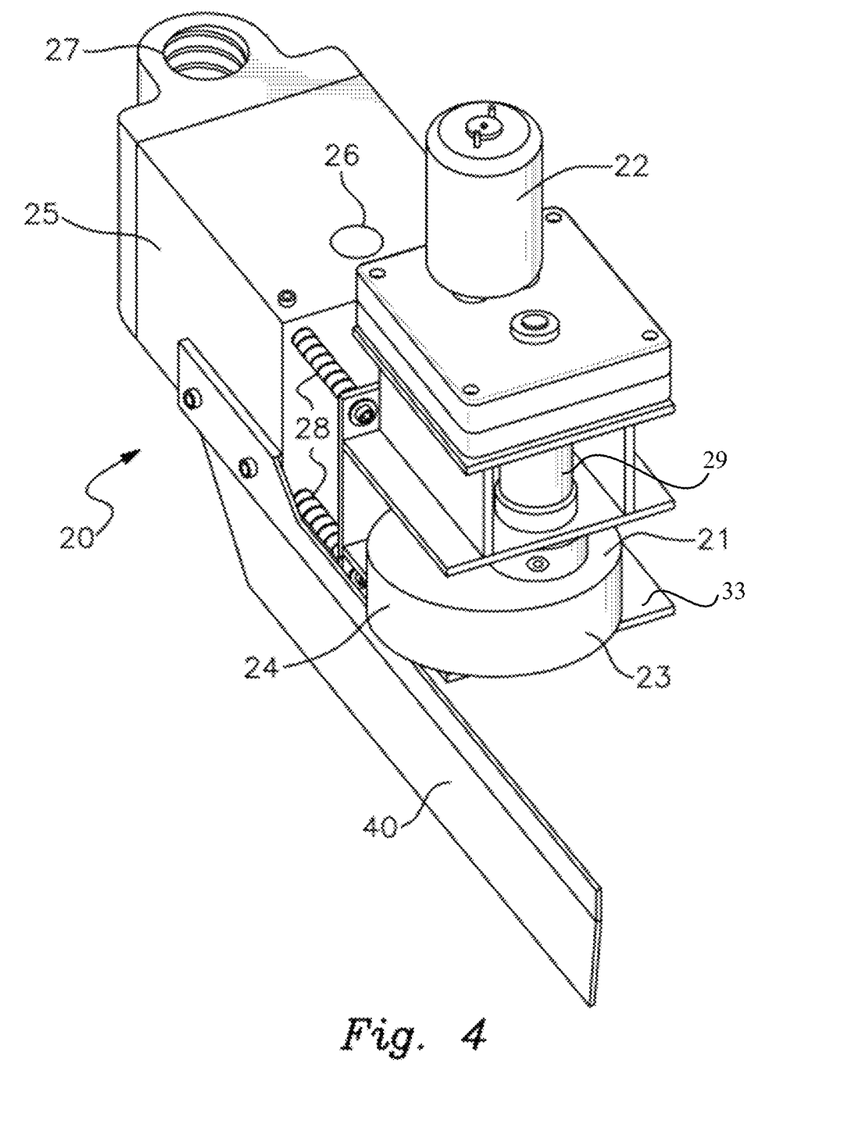
FIG. 4 is a perspective view of the ejector assembly of the embodiment of the apparatus shown in FIG. 1, wherein the cam member is positioned in the recessed orientation.
Figure 5:
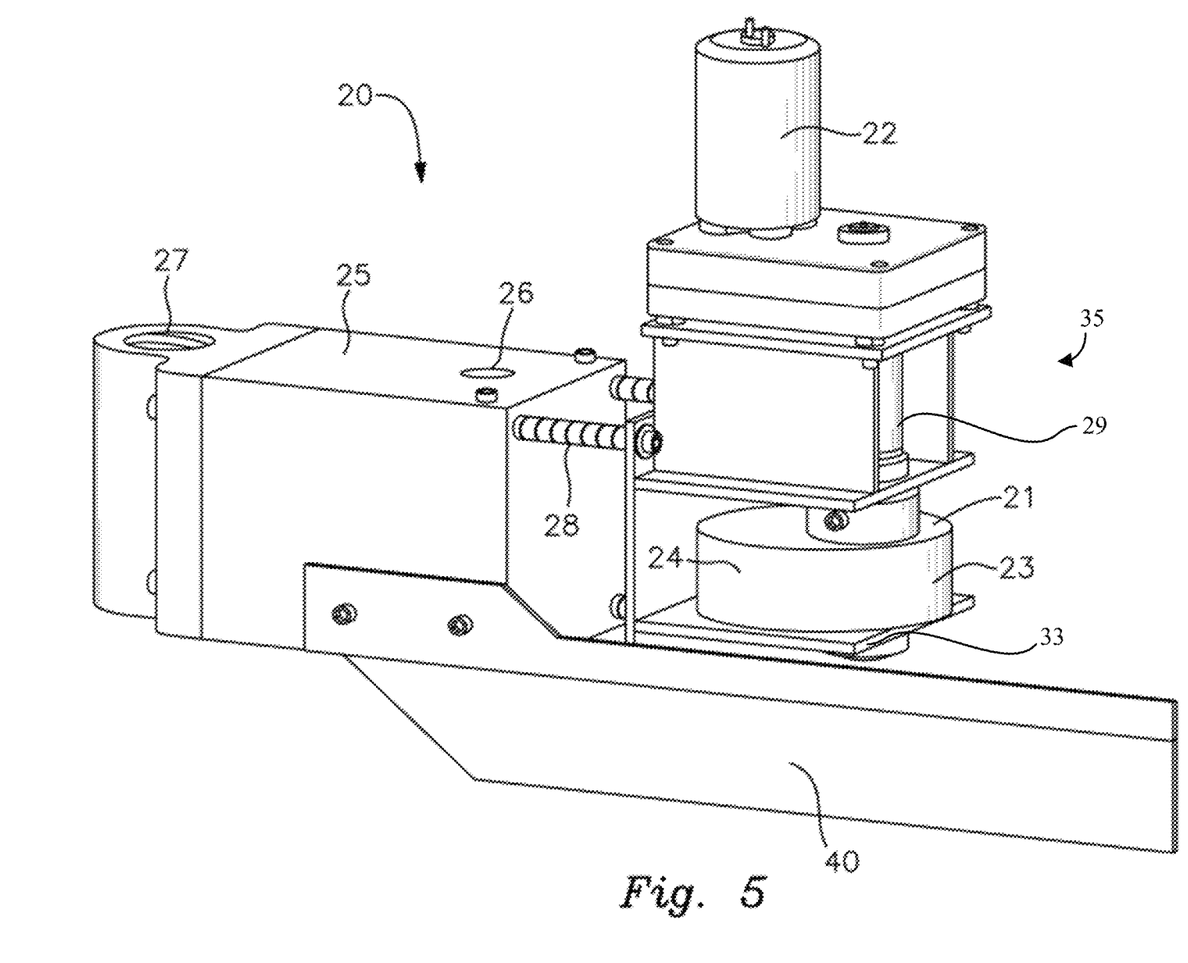
FIG. 5 is a front view of the ejector assembly of the embodiment of the apparatus shown in FIG. 1, wherein the cam member is positioned in the recessed orientation.
Figure 6:
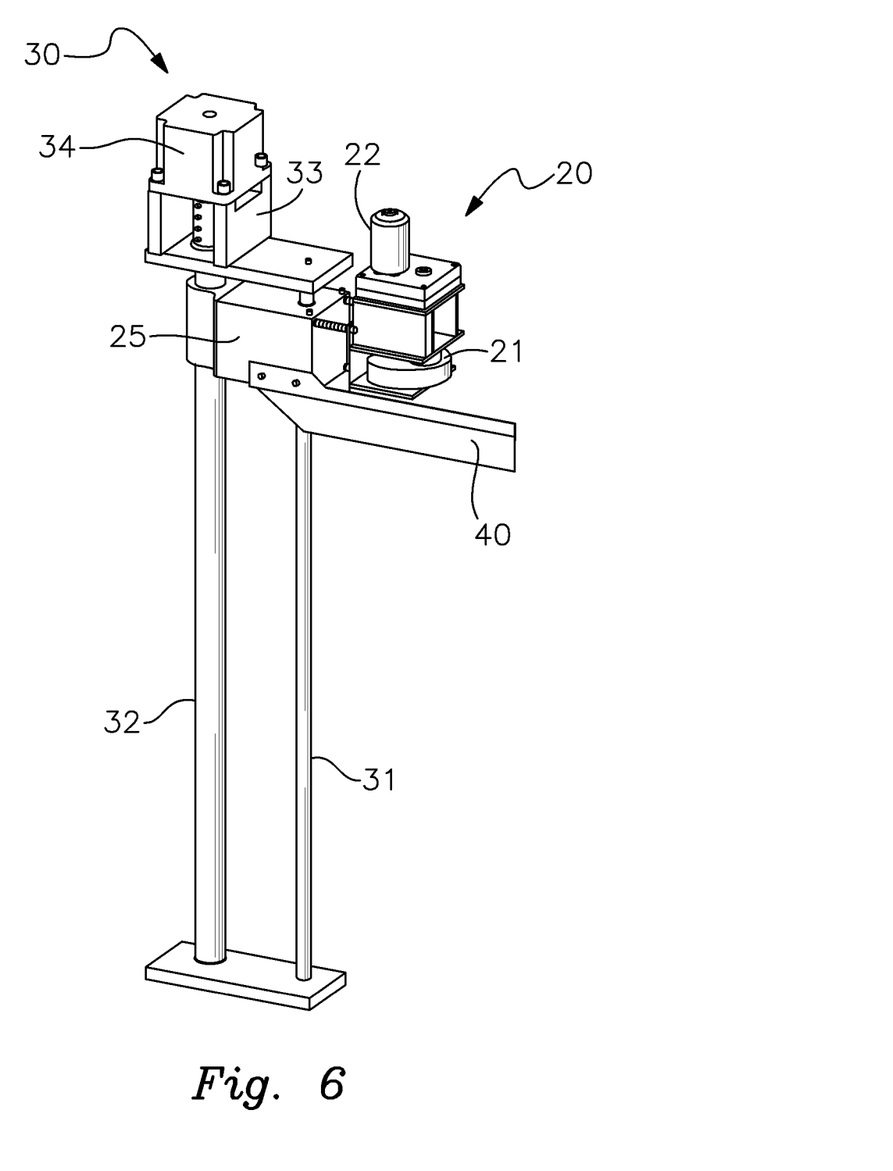
FIG. 6 is a view of the ejector assembly and the elevator mechanism with the ejector assembly positioned in the uppermost position.
Figure 7:
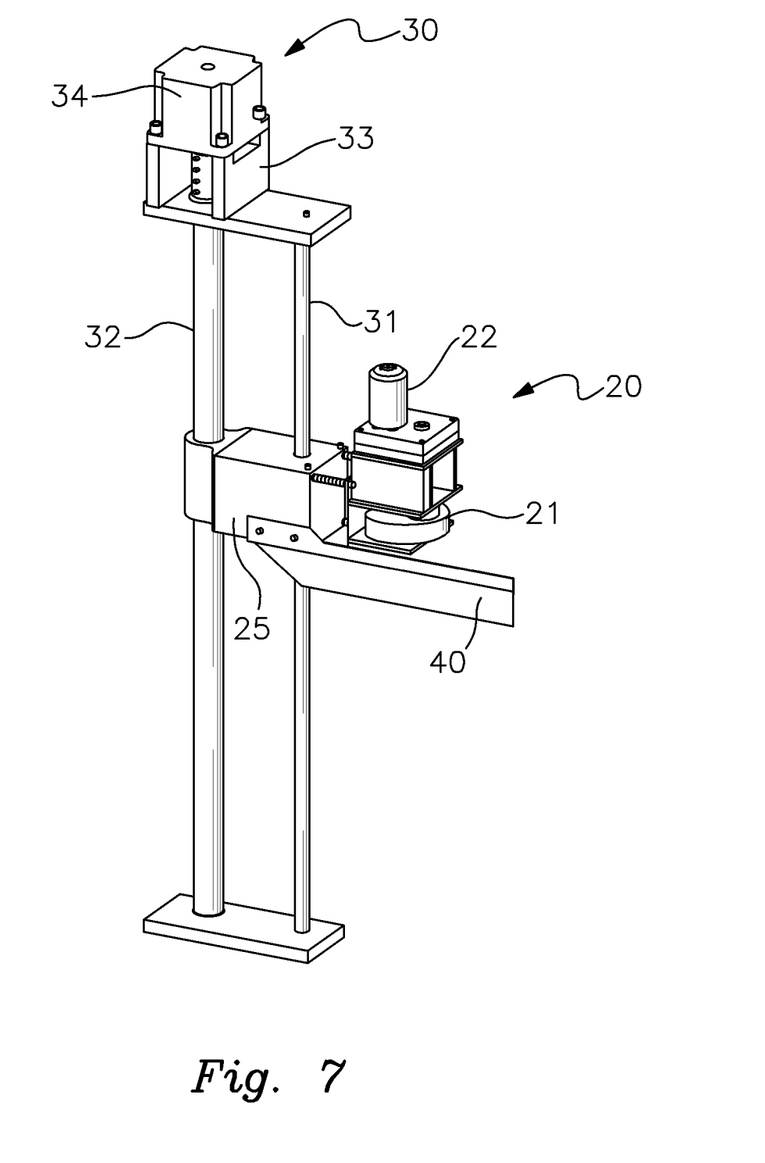
FIG. 7 is a view of the ejector assembly and the elevator mechanism of FIG. 6 with the ejector assembly positioned in a lowered position.
Figure 8:
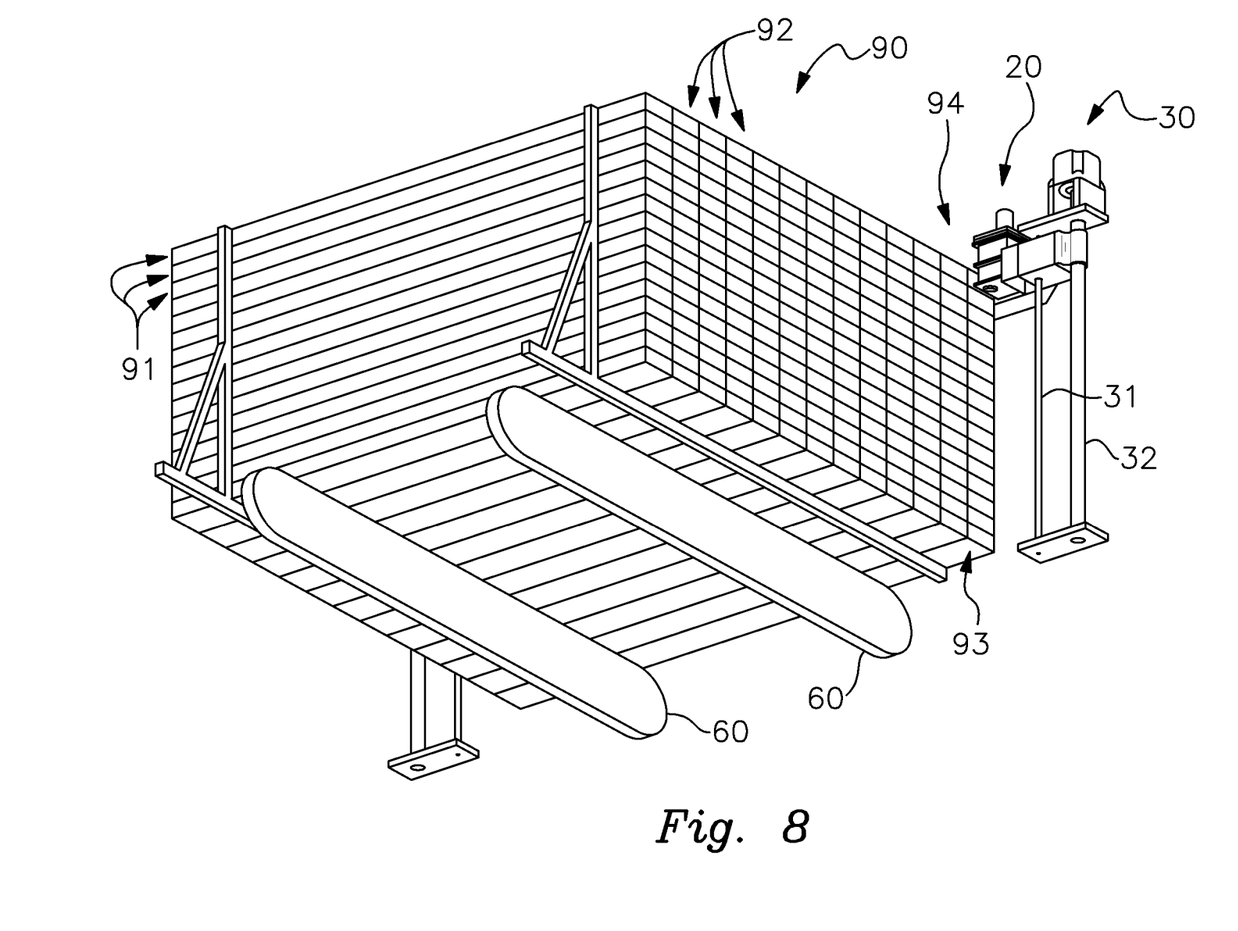
FIG. 8 is a bottom perspective view of the embodiment of the apparatus shown in FIG. 1.

As shown in more detail in FIGS. 2-5, each ejector sub-assembly (20) comprises a rotatable cam member (21) positioned within mounting housing (35) such that the cam member (21) can be rotated between a recessed orientation and a contacting orientation relative to the end (11) of the uppermost board member (13). FIG. 5 illustrates an example of the rotatable cam member (21) in a recessed orientation. FIG. 3 illustrates an example of the rotatable cam member (21) in a contacting orientation. As shown in FIGS. 4-5, the cam member (21) is rotatably fastened to a cam platform (33) of the mounting housing (35) via rod (29). The rod (29) provides a fixed axis of rotation at an offset position for the cam member (21). The cam member (21) is coupled to a cam motor (22) via the rod (29) and is rotated about its axis by the cam motor (22). As shown in FIGS. 3-5, the cam member (21) has a short radius surface portion (23) defined by shorter radii ($r_1$) extending from the axis of rotation to a first side of the cam member (21) and a long radius surface portion (24) defined by longer radii ($r^2$) relative to the shorter radii, extending from the axis of rotation to a second side of the cam member (21). Each ejector sub-assembly (20) further includes a mounting block (25) with a bore (27) extending there through. The rotatable cam member (21), via the mounting housing (35), is connected to the mounting block (25).

In the recessed orientation, wherein the short radius surface portion (23) of the cam member (21) faces the end (11) of the board (13), the cam member (21) does not abut the end (11) of the board (13). In the contacting orientation, wherein the long radius surface portion (24) of the cam member (21) is brought into abutment with the end (11) of the board (13) continued rotation of the cam member (21) results in ejection of the board (13) from the outermost vertical column (93). The rotation of the two cam members (21) being in opposing directions such that the uppermost board (13) is ejected away from the stack (90).

Thus, the material handling assembly (4) comprises a first ejector sub-assembly (20), the first ejector sub-assembly being positioned adjacent to a first end (11) of the bundle; the first sub-assembly (20) comprising a first rotatable cam member (21), wherein the first cam member rotates between a recessed position (23) and a contacting position (24) with the uppermost item. The material handling assembly (4) also comprises a second ejector sub-assembly (20); the second ejector sub-assembly being positioned adjacent to an opposing second end (15) of the bundle; the second sub-assembly (20) comprising a second rotatable cam member (21), wherein the second cam member rotates between a recessed position (23) and a contacting position (24) with the uppermost item so that when the cam member of the first ejector sub-assembly and the cam member of the second ejector sub-assembly make contact with the uppermost item (13) in the vertical column (92), the uppermost item is ejected from the bundle.

Each ejector sub-assembly (20) may further comprise a retention member (40) such as a short arm, rod, plate member, or similar construct, that extends across the exposed front face (12) of the board (14) positioned directly beneath the uppermost board (13). The retention member (40) prevents the adjacent lower board (14) from forward movement when the uppermost board (13) is ejected due to frictional forces, such that the integrity of the outermost vertical column (93) is maintained. The ejector sub-assemblies may further comprise spring members (28) which absorb the shock and allows for some outward movement of the cam member (21) away from the board end (11) when the long radius surface portion (24) is rotated against the end (11) of the uppermost board (13). Thus, each of the each of the first and second ejector sub-assemblies (20) may comprise a retention member (40) that prevents the underlying item (14) from being ejected as the uppermost item (13) is being ejected. Each of the first and second ejector sub-assemblies (20) also may comprise a pair of springs (28) that absorb forces from movement of the item (90) when the first and second sub-assemblies (20) make contact with the item in the bundle.

Each ejector sub-assembly (20) may further comprise an elevator mechanism (30), which functions to raise and lower the ejector sub-assemblies (20) for proper alignment with the uppermost board (13) to be ejected from the outermost vertical column (93). As shown in FIGS. 1 and 6-8, the elevator mechanism (30) preferably comprise a guide rod (31) which passes through a guide rod bore (26) disposed in the ejector sub-assembly mounting block (25); a threaded rod (32) passing through a threaded bore (27) disposed in the ejector sub-assembly mounting block (25), and an elevator motor (34) which rotates the threaded rod (32) in order to raise or lower the ejector sub-assembly (20) as required.

Thus, in one preferred embodiment, the material handling assembly comprises: i) a bundle of multiple elongated items, the items being arranged horizontally in a stack so that one item overlays a second item, the stacked items forming a horizontal row and vertical column, wherein the vertical column contains an uppermost and a lowermost item; ii) a first ejector sub-assembly, the first ejector sub-assembly being positioned adjacent to a first end of the bundle; the sub-assembly comprising a first rotatable cam member, wherein the cam member rotates between a recessed position and a contacting position with the uppermost item; and the first ejector assembly includes a first mounting housing, the housing having a bore extending there through; and iii) a first vertical rod (32) extending through the bore (27) of the first mounting housing, wherein the rod is adapted to rotate, thereby raising and lowering the ejector sub-assembly to a position such that the first rotatable cam member is adjacent to the item that will be ejected from the bundle.

In addition, the material handling assembly comprises: iv) a second ejector sub-assembly, the second ejector sub-assembly being positioned adjacent to a second end of the bundle; the sub-assembly comprising a second rotatable cam member, wherein the cam member rotates between a recessed position and a contacting position with the uppermost item; and the second ejector assembly includes a second mounting housing, the housing having a bore extending there through; v) a second vertical rod extending through the bore of the second mounting housing, wherein the rod is adapted to rotate, thereby raising and lowering the ejector sub-assembly to a position such that the second rotatable cam member is adjacent to the item that will be ejected from the bundle. Thus, when the cam member of the first ejector sub-assembly and the cam member of the second ejector sub-assembly make contact with the uppermost item in the vertical column, the uppermost item is ejected from the bundle.

In one preferred embodiment, the first rotatable cam member is rotatably fastened to a first cam platform and the first mounting housing is coupled to the first cam platform; and the second rotatable cam member is rotatably fastened to a second cam platform and the second mounting housing is coupled to the second cam platform. The first and second vertical rods (32) are preferably actuated by motors; and the first and second rotatable cam members (21) also are preferably actuated by motors.

In order to better maintain the integrity of the stack (90) as the boards (10) are ejected, compression members (50) may be provided which apply downward pressure against the top board of the adjacent vertical column (94). This compression assures that the adjacent vertical column (94) remains intact as the boards (10) are removed from the outermost vertical column (93). The compression member (50) may comprise a retractable/extendable abutment member (51) mounted onto a frame (52) affixed above the adjacent vertical column (94), the abutment member (51) being retracted when the adjacent vertical column (94) is advanced to become the outermost vertical column (93), then extended to abut the new adjacent vertical column (94).

Each ejector sub-assembly (20), when actuated, removes the uppermost individual board (13) in the outermost vertical column (93) of boards (10), the long radius portion (24) of each cam member (21) being brought into contact with a board end (11) to propel the uppermost board (13) off the outermost vertical column (93). Upon ejecting the uppermost board (13), the cam members (21) are oriented into the recessed position such that the short radius surface portion (23) faces the board ends (11). The two ejector sub-assemblies (20) are then lowered by actuation of the elevator motors (34) of the elevator mechanism (30) to be aligned with the ends (11) of the previous adjacent lower board (14), which now becomes the new uppermost board (13) in the outermost vertical column (93). Upon ejection of the uppermost board (13) by the ejector sub-assemblies (20), these steps are repeated down the outermost vertical column (93) until all of the boards 910) have been removed from the outermost vertical column (93).

After ejection of the last board (10) from the outermost vertical column (93), the stack (90) is advanced such that the now-exposed outermost vertical column (93), originally the adjacent vertical column (93) in the stack (90), is positioned between the ejector sub-assemblies (20), the ejector sub-assemblies (20) being raised by the elevator mechanism (30), either before or after forward movement of the stack (90). This brings the ejector sub-assemblies into alignment with the uppermost board (13) of this now outermost vertical column (93), the cam members (21) being oriented in the recessed position. The sequential removal of uppermost boards (13) from this outermost vertical column (93) is repeated as before, and the stack (90) is successively advanced until each of the vertical columns (92) has been positioned between the ejector sub-assemblies and all boards (10) have been ejected.

Figure 9:
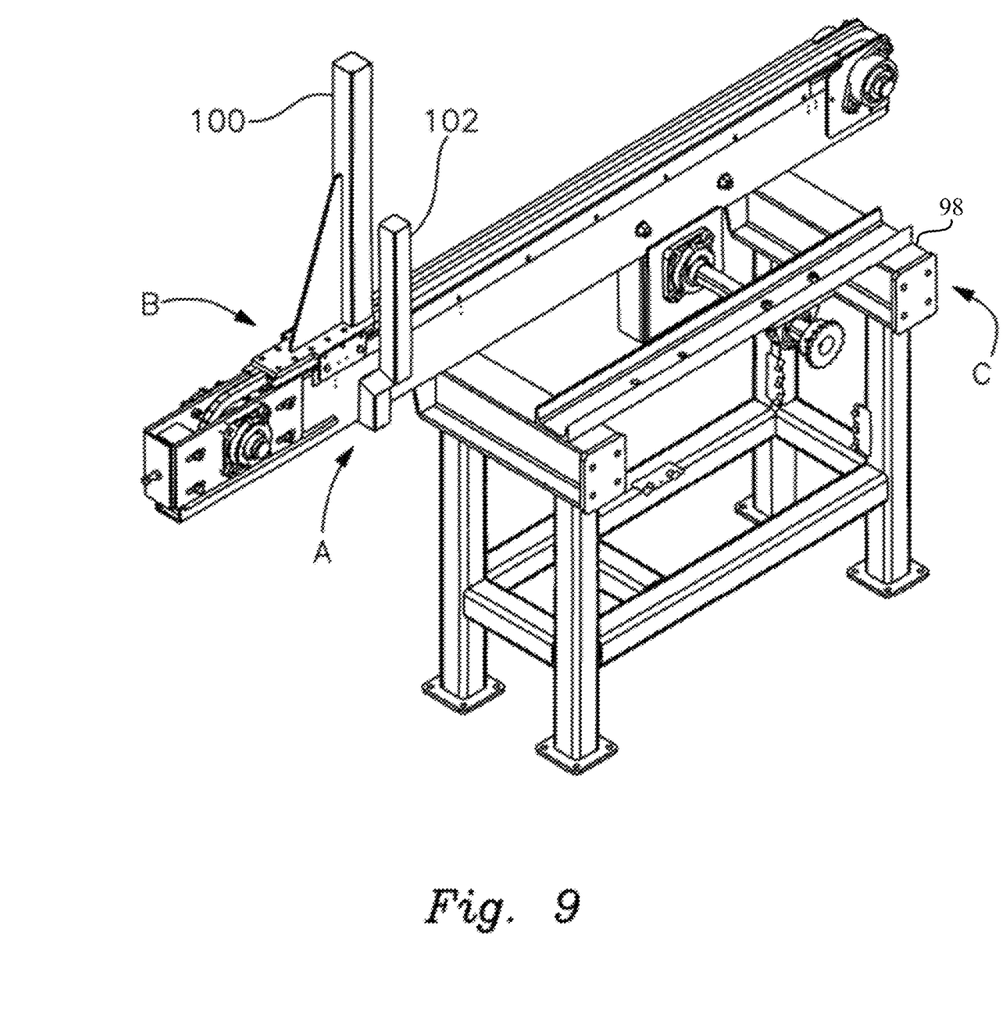
FIG. 9 is a perspective view of one embodiment of the stack advancement frame for the material handling apparatus of the invention.
Figure 10:
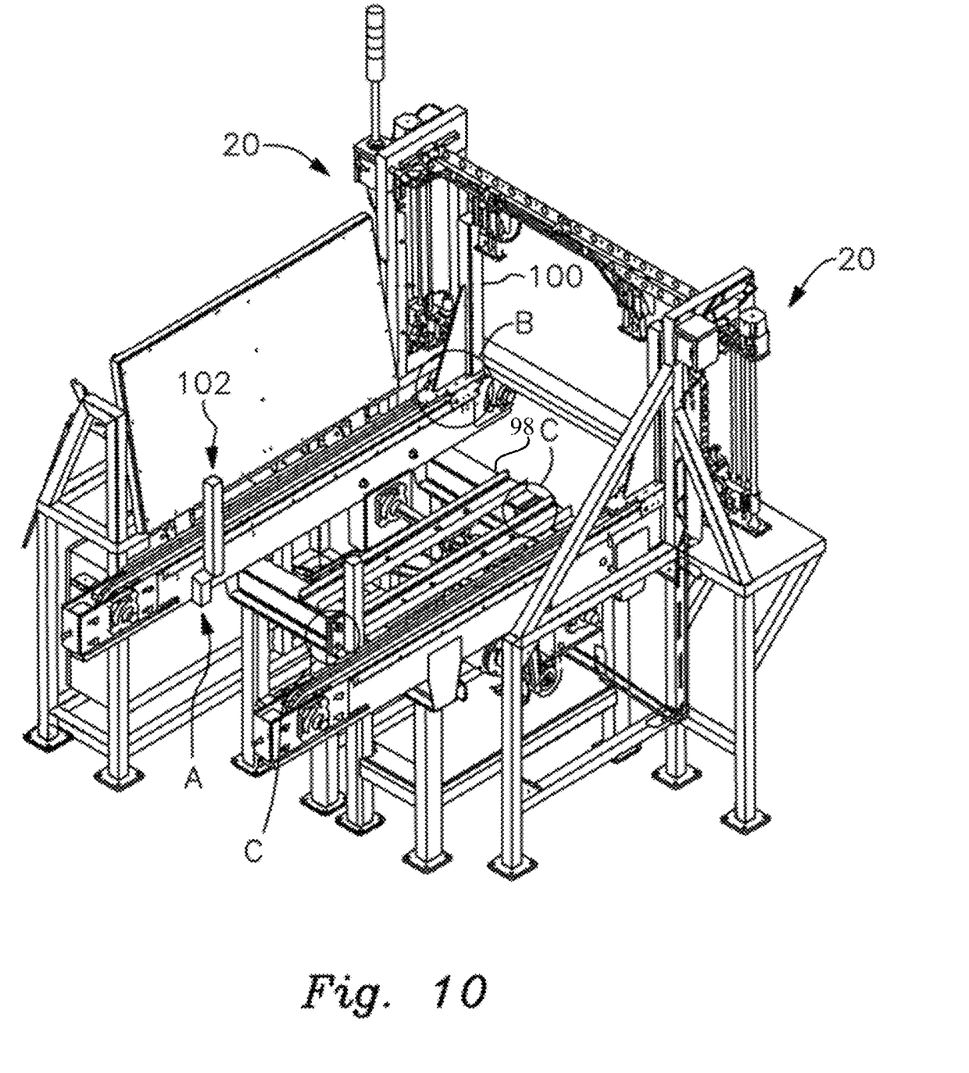
FIG. 10 is a top perspective view of one embodiment of the material handling apparatus of the invention showing the stack advancement frame.
Figure 11:
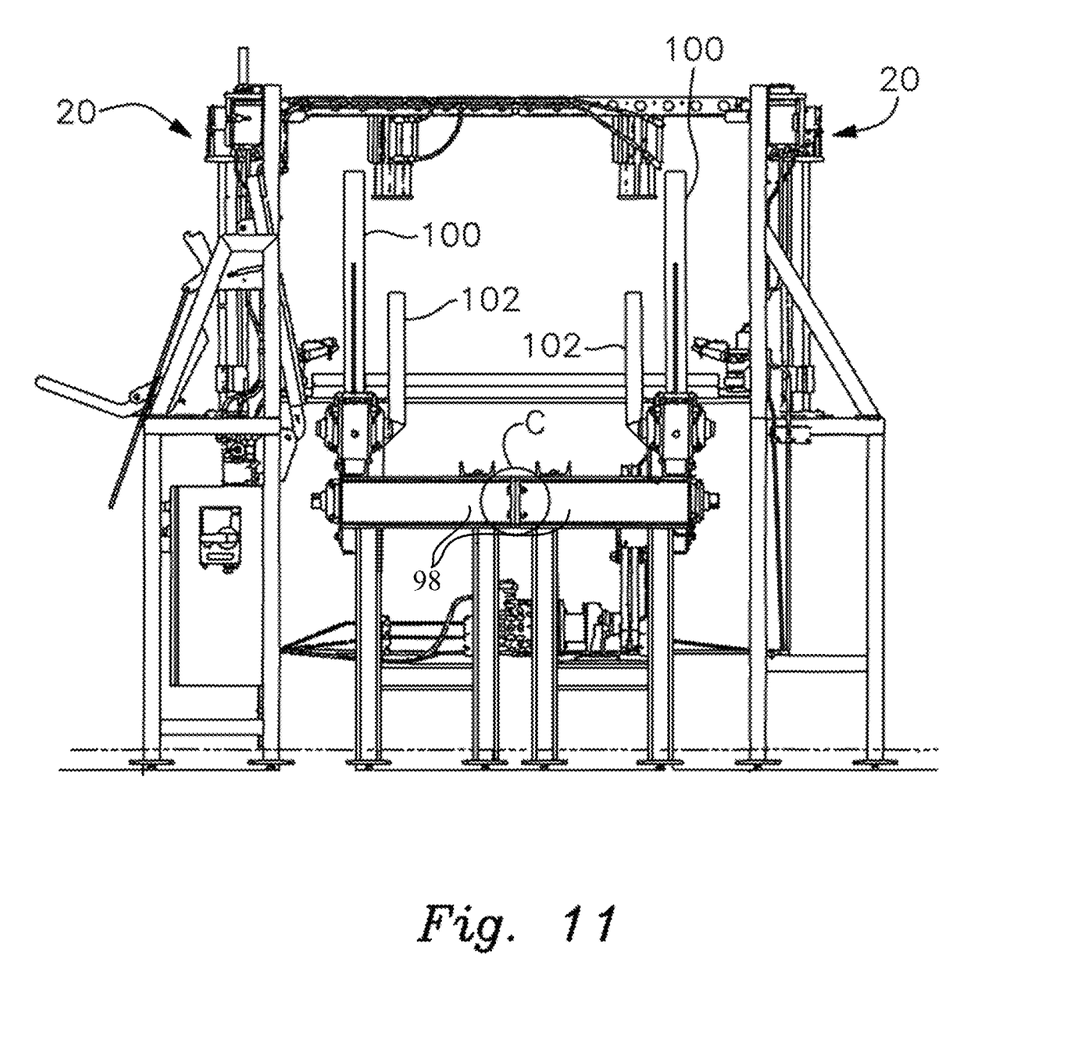
FIG. 11 is a rear view of the apparatus shown in FIG. 9, showing the stack advancement frame.

As discussed above, the stack (bundle) (90) is positioned in or on a reciprocating frame and advanced by a stack advancement mechanism (60), such as, for example, a chain/belt, a screw drive, or the like. When this stack advancement system (60) is operating, the system is referred to as a live deck. The stack is advanced such that the outermost vertical column (93) of boards (10) is positioned between two opposing ejector sub-assemblies (20). Turning to FIGS. 9-11, a frame (98) for the live deck is shown. The frame (98) includes a vertical rear support (100) which indexes forward with the stack. A vertical backstop (102) is fixed and allows a forklift driver to load the bundle without overloading the rear supports (100). The vertical backstop (102) is welded to the frame of the live deck at Point A. The live deck (not shown) attaches to the vertical rear support (100) and conveys vertical rear support (100) forward at Point B. At point(s) C, the frame (98) has bolt holes (104) to attach to a second, symmetrical frame (not shown). Additionally, the system is modular such that a segment of frame (98) can be added in between in order to expand the system to accommodate bundles of longer boards. The drive shaft (not shown) is segmented in the same way as the frame, such that it can either bolt directly to a mirrored assembly or a spacer can be included to accommodate a longer system.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

It also should be understood the terms, "first", "second", "top", "bottom", "front", "back", "upper", "lower", "uppermost", "lowermost", "upward", "downward", "right", "left", "inner" "outer", and the like are arbitrary terms used to refer to one position of an element based on one perspective and should not be construed as limiting the scope of the invention.

It is understood that the apparatuses, systems, methods, and constructions described and illustrated herein represent only some embodiments of the invention. It is appreciated by those skilled in the art that various changes and additions can be made to the apparatus, processes, and materials without departing from the spirit and scope of this invention.

We claim:

1. A material handling assembly for selecting and delivering an item from a bundle of items, comprising:
    a first ejector sub-assembly comprising:
    a first motor;
    a first rod; and
    a first rotatable cam member coupled to the first motor via the first rod, wherein the first rod provides a fixed axis of rotation at an offset position for the first rotatable cam member, wherein the first rotatable cam member has a short radius between the first rod and a first side of the first rotatable cam member and a long radius between the first rod and a second side of the first rotatable cam member such that when the first rotatable cam member rotates about the fixed axis of rotation provided by the first rod, the first rotatable cam member moves the second side of the first rotatable cam member between a recessed position and an item contacting position;
    a second ejector sub-assembly, comprising:
    a second motor;
    a second rod; and
    a second rotatable cam member coupled to the second motor via the second rod, wherein the second rod provides a fixed axis of rotation at an offset position for the second rotatable cam member, wherein the second rotatable cam member has a short radius between the second rod and a first side of the second rotatable cam member and a long radius between the second rod and a second side of the second rotatable cam member such that when the second rotatable cam member rotates about the fixed axis of rotation provided by the second rod, the second rotatable cam member moves the second side of the second rotatable cam member between a recessed position and an item contacting position; and wherein the first ejector sub-assembly and the second ejector sub-assembly are vertically aligned such that when the first rotatable cam member of the first ejector sub-assembly is in the item contacting position and the second rotatable cam member of the second ejector sub-assembly is in the item contacting position, the first rotatable cam member and the second rotatable cam member each make contact with the item, such that as the second side of the first rotatable cam member and the second side of the second rotatable cam member rotate from the item contacting position to the recessed position, the item is ejected from the bundle.

2. The material handling assembly of claim 1, wherein the items are lumber boards.

3. The material handling assembly of claim 1, wherein the first ejector sub-assembly further comprises a first retention member disposed below the first rotatable cam member, wherein the second ejector sub-assembly further comprises a second retention member disposed below the second rotatable cam member, and wherein the first retention member and the second retention member prevent an underlying item from being ejected as the item is being ejected.

4. The material handling assembly of claim 1, wherein the first and second ejector sub-assemblies each include a pair of springs that absorb forces when the first and second sub-assemblies make contact with an item in the bundle.

5. The material handling assembly of claim 1, further comprising at least one compression member for applying downward pressure against an uppermost item of the bundle.

6. The material handling assembly of claim 1, further comprising a support frame for supporting the bundle above a ground surface.

7. The material handling assembly of claim 6, wherein the support frame comprises a vertical rear support, wherein the support frame enables the vertical rear support to index forward, advancing the bundle of items along the support frame in a forward direction until a vertical column of items of the bundle of items is positioned between the first and second ejector sub-assemblies.

8. The material handling assembly of claim 1 wherein the first ejector sub-assembly further comprises:

a first mounting block, the first mounting block having a first bore extending there through, wherein the first rotatable cam member is coupled to the first mounting block;

a first mounting rod extending through the first bore of the first mounting block, wherein the first mounting rod allows for vertical movement of the first mounting block for raising and lowering the first ejector sub-assembly to a position adjacent to the item; and wherein the second ejector sub-assembly further comprises:

a second mounting block, the second mounting block having a second bore extending there through, wherein the second rotatable cam member is coupled to the first mounting block; and a second mounting rod extending through the second bore of the second mounting block housing, wherein the first mounting rod allows for vertical movement of the first mounting block for raising and lowering the second ejector sub-assembly to a position.

9. The material handling assembly of claim 8, further comprising a first elevator motor and a second elevator motor, wherein the first and second mounting rods are actuated by the first and second elevator motors.

10. The material handling assembly of claim 8, further comprising:

a first mounting housing including a first cam platform, wherein the first rotatable cam member is rotatably fastened to the first cam platform via the first rod, wherein the first rotatable cam member is coupled to the first mounting block via the first cam platform; and a second mounting housing including a second cam platform, wherein the second rotatable cam member is rotatably fastened to the second cam platform via the second rod, wherein the second rotatable cam member is coupled to the second mounting block via the second cam platform.

11. The material handling assembly of claim 10, wherein the first mounting block is coupled to the first mounting housing by first spring members and the second mounting block is coupled to the second mounting housing by second spring members.

* * * * *